United States Patent
Kane et al.

(10) Patent No.: US 9,438,480 B2
(45) Date of Patent: Sep. 6, 2016

(54) GENERATING A REPRESENTATION OF THE STATUS OF A DATA PROCESSING SYSTEM BASED ON EMPIRICAL OPERATIONS METRICS AND DERIVED SENTIMENT METRICS

(71) Applicant: CA, INC., Islandia, NY (US)

(72) Inventors: John P Kane, Tafton, PA (US); Vincent Re, Saint James, NY (US); Daniel Holmes, Madbury, NH (US); Darryl Bond, Center Moriches, NY (US)

(73) Assignee: CA, Inc., New York, NY (US)

( * ) Notice: Subject to any disclaimer, the term of this patent is extended or adjusted under 35 U.S.C. 154(b) by 351 days.

(21) Appl. No.: 14/223,730

(22) Filed: Mar. 24, 2014

(65) Prior Publication Data

US 2015/0271036 A1     Sep. 24, 2015

(51) Int. Cl.
  *G06F 15/173*   (2006.01)
  *H04L 12/24*    (2006.01)
  *H04L 12/26*    (2006.01)

(52) U.S. Cl.
  CPC ......... *H04L 41/142* (2013.01); *H04L 41/5074* (2013.01); *H04L 43/0817* (2013.01)

(58) Field of Classification Search
  USPC .......... 709/203, 224, 223, 217, 200
  See application file for complete search history.

(56) References Cited

U.S. PATENT DOCUMENTS

| | | | |
|---|---|---|---|
| 6,115,718 A * | 9/2000 | Huberman | G06F 17/30011 |
| 2005/0177449 A1 * | 8/2005 | Temares | G06Q 30/02 |
| | | | 705/7.33 |
| 2009/0265333 A1 * | 10/2009 | Bhesania | G06Q 30/0282 |
| 2013/0041905 A1 * | 2/2013 | Davies | G06Q 30/00 |
| | | | 707/748 |
| 2016/0063144 A1 * | 3/2016 | Cooke | G06F 17/5009 |
| | | | 703/2 |

* cited by examiner

*Primary Examiner* — El Hadji Sall
(74) *Attorney, Agent, or Firm* — Myers Bigel & Sibley, P.A.

(57) ABSTRACT

A method includes performing operations as follows on a processor: communicating with a data processing system to collect empirical data associated with operations of the data processing system, communicating with a customer feedback system to collect user sentiment data associated with the data processing system, generating an operational status of the data processing system based on the empirical data, generating a sentimental status of the data processing system based on the user sentiment data, and generating a composite status of the data processing system based on the operational status and the sentimental status.

27 Claims, 5 Drawing Sheets

US 9,438,480 B2

GENERATING A REPRESENTATION OF THE STATUS OF A DATA PROCESSING SYSTEM BASED ON EMPIRICAL OPERATIONS METRICS AND DERIVED SENTIMENT METRICS

BACKGROUND

The present disclosure relates to computing systems, and, in particular, to monitoring and performance management of computing systems.

Computer operations environment monitoring and management systems often determine the operational status of a computer system based on management data comprising, for example, fault, performance and utilization measurements. These data may be, for example, visualized as time-series style charts with multiple data sets plotted against time on the x-axis. A typical such polyline chart might display either a single systems management metric with a separate data set for each different resource/object, or a single object with a separate data set for each different systems management metric.

FIG. 1 is a block diagram of a conventional system for managing the performance of one or more data processing systems. A performance management system 105 is connected to three data processing systems 110, 120, and 130 and includes an empirical data collection module. The performance management system 105 including the empirical data collection module is configured to communicate with the three data processing systems 110, 120, and 130 to collect performance data from the three data processing systems 110, 120, and 130 for various performance metrics and, after processing, to provide the data to the network operations console 100 for review by administrative personnel.

SUMMARY

In some embodiments of the inventive subject matter, a method comprises performing operations as follows on a processor: communicating with a data processing system to collect empirical data associated with operations of the data processing system, communicating with a customer feedback system to collect user sentiment data associated with the data processing system, generating an operational status of the data processing system based on the empirical data, generating a sentimental status of the data processing system based on the user sentiment data, and generating a composite status of the data processing system based on the operational status and the sentimental status.

In other embodiments, the empirical data comprises cumulative network traffic volume data, recent network traffic volume data, cumulative Transmission Control Protocol (TCP) connections data, recent TCP connections data, Central Processing Unit (CPU) utilization data, thread CPU utilization data, and/or memory utilization data.

In still other embodiments, the user sentiment data comprises social networking comment data, customer survey data, service desk system data, Internet blog data, Internet forum data, and/or Customer Relationship Management (CRM) data.

In still other embodiments, generating an operational status of the data processing system comprises: defining operational metrics with defined thresholds, respectively, comparing the empirical data with the defined thresholds to generate a comparison result, and applying an operational policy to the comparison result to generate the operational status.

In still other embodiments, generating the sentimental status of the data processing system comprises generating a sentimental status for an application that executes on the data processing system.

In still other embodiments, generating the composite status of the data processing system comprises applying a composite policy to the operational status and the sentimental status to generate the composite status.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
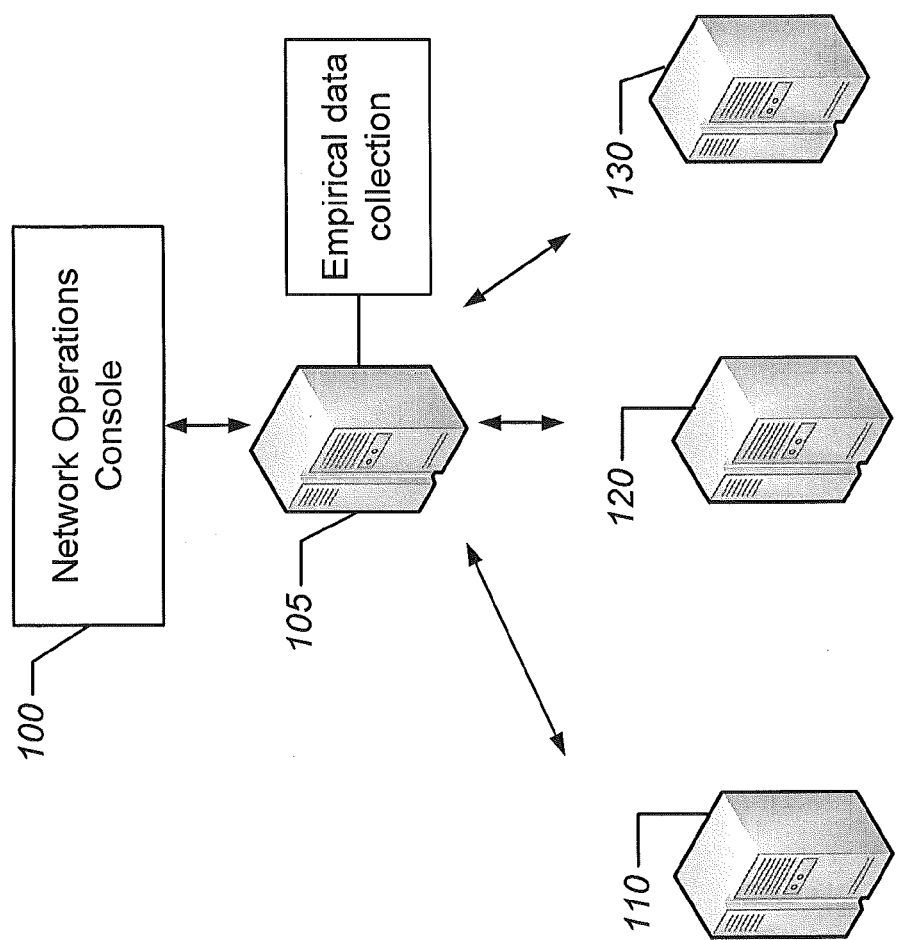
FIG. 1 is a block diagram of a conventional system for managing the performance of one or more data processing systems.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Further-more, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the term "data processing facility" includes, but it not limited to, a hardware element, firmware component, and/or software component. A data processing system may be configured with one or more data processing facilities.

As used herein, "operational status" of a data processing system is a representation of the performance of the data processing system based on empirical data associated with elements comprising the data processing system including, but not limited to, the performance of processor elements, hardware elements, software elements, firmware elements, storage elements, memory elements, communication networking elements, and/or communication channel elements. Thus, "operational status" may encompass the performance of a computer system, a suite of computer systems, the operating system, application software, and other software/firmware components that run on the computer system(s) and the communication network(s) that connect with the computer system(s).

As used herein, "sentimental status" of a data processing system is a representation of the opinion(s) of user(s) of the data processing system and is based on user sentiment data associated with elements comprising the data processing system including, but not limited to, processor elements, hardware elements, software elements, firmware elements, storage elements, memory elements, communication networking elements, and/or communication channel elements.

Some embodiments of the inventive subject matter stem from a realization that that while conventional systems for managing the performance of a data processing system collect and process data related to the operational status of the data processing system, such performance management systems do not provide insight into how key constituents of the data processing view the data processing system. While the operational status of the data processing system may indicate that all components are operating at a level that meets or exceeds minimum performance standards, ultimately it may be desirable to ensure that key constituents, such as customers, stakeholders, executives, and the like are happy with the operations and services provided by the data processing system, According to some embodiments of the inventive subject matter, both empirical data associated with the operations of a data processing system and user sentiment data associated with the data processing system can be collected. An operational status can be generated based on the empirical data and a sentimental status may be generated based on the user sentiment data, A composite status of the data processing system can be generated based on both the operational status and the sentimental status. The sentimental status may provide insight into how users view the data processing system and the services provided by the data processing system. For example, users may be content, thrilled, annoyed, unhappy and planning to discontinue use of the data processing system, etc. After reviewing the sentimental status for a data processing system, an administrator may be alerted that although the data processing system is meeting all performance requirements, user sentiment has turned against the data processing system with customers indicating a desire to discontinue service when a comparable service is available, etc.

Figure 2:
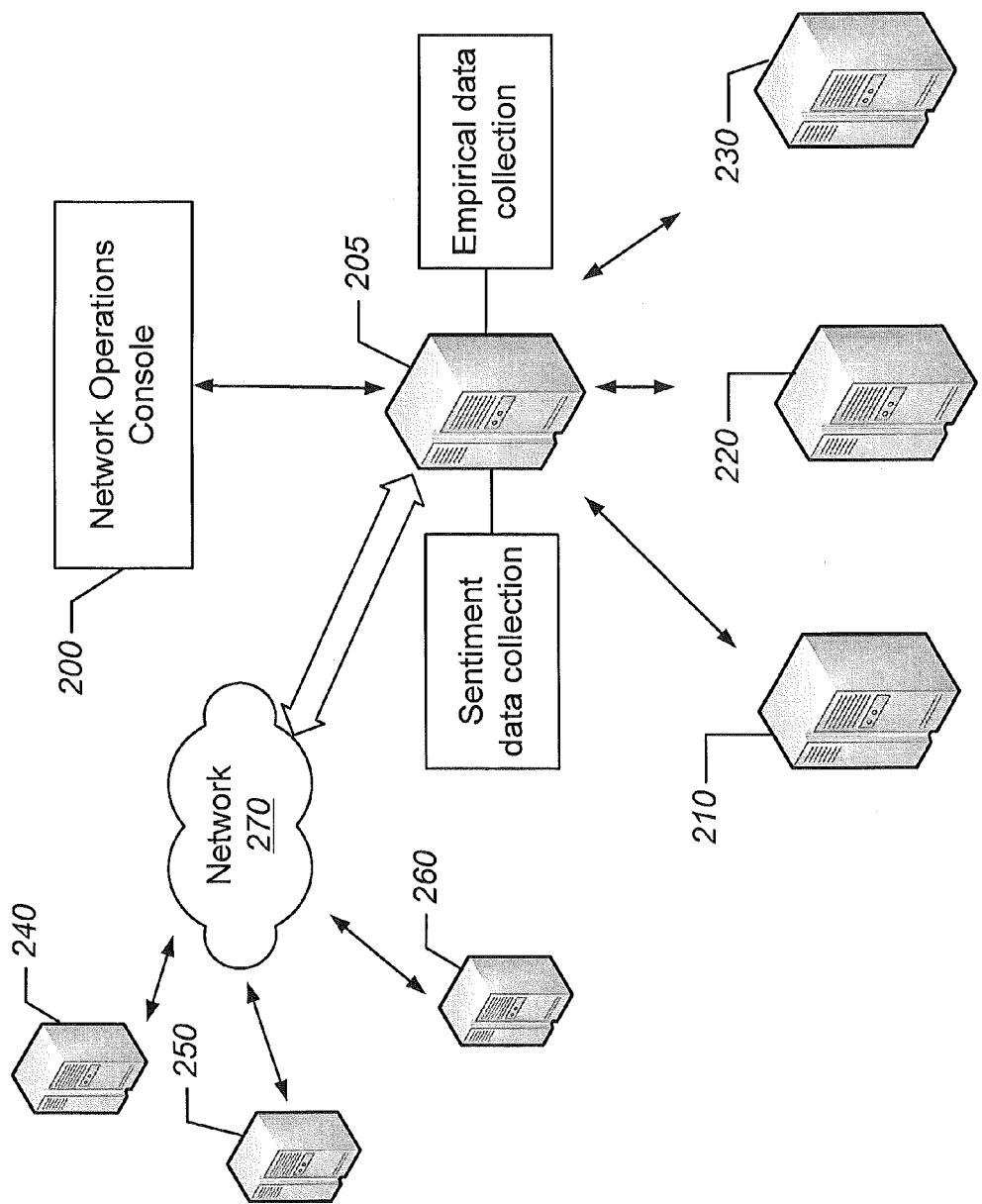
FIG. 2 is a block diagram of a system for managing the performance of one or more data processing systems according to some embodiments of the inventive subject matter.

FIG. 2 is a block diagram of a system for managing the performance of one or more data processing systems according to some embodiments of the inventive subject matter. A performance management system 205 is connected to three data processing systems 210, 220, and 230 and includes an empirical data collection module and a sentiment data collection module. The performance management system 205 via the empirical data collection module is configured to communicate with the three data processing systems 210, 220, and 230 to collect performance data from the three data processing systems 210, 220, and 230 for various performance metrics and, after processing, to provide the data to the network operations console 200 for review by administrative personnel. Although three data processing systems 210, 220, and 230 are shown, it will be understood that the performance of fewer or more data processing systems can be managed in accordance with various embodiments of the inventive subject matter. The performance management system 205 via the sentiment data collection module is configured to communicate with server systems 240, 250, and 260 via a network 270. The server systems 240, 250, 260 are sources of user sentiment data for one or more of the data processing systems 210, 220, and 230 and may include, but are not limited to, social networking comment data, customer survey data, service desk system data, Internet blog data, Internet forum data, and/or Customer Relationship Management (CRM) data. The social networking comment data may include, but are not limited to, Internet search engine comments, Facebook posts, and/or Twitter tweets. While three server systems 240, 250, and 260 are shown in FIG. 2, it will be understood that fewer or more server systems may be accessed to collect user sentiment data associated with one or more of the data processing systems 210, 220, and 230. The network 270 may be a global network, such as the Internet or other publicly accessible network. Various elements of the network 270 may be interconnected by a wide area network, a local area network, an Intranet, and/or other private network, which may not be accessible by the general public. Thus, the communication network 270 may represent a combination of public and private networks or a virtual private network (VPN). The network 270 may be a wireless network, a wireline network, or may be a combination of both wireless and wireline networks.

Although FIG. 2 illustrates a performance management system for managing the performance of one or more data processing systems according to some embodiments of the inventive subject matter, it will be understood that embodiments of the present invention are not limited to such configurations, but are intended to encompass any configuration capable of carrying out the operations described herein.

Figure 3:
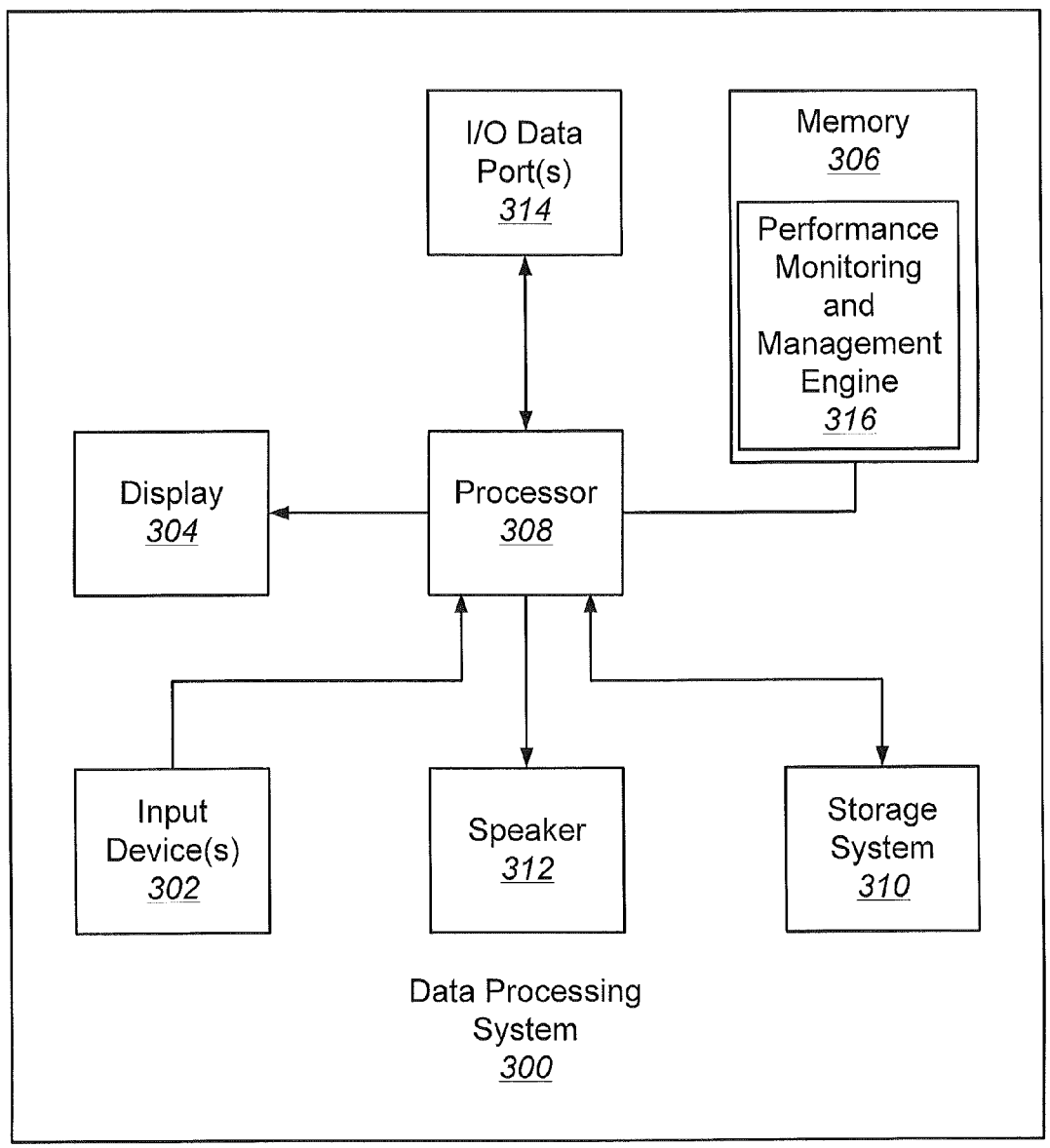
FIG. 3 illustrates a data processing system that may be used to implement the performance management system of FIG. 2, in accordance with some embodiments of the inventive subject matter.

Referring now to FIG. 3, a data processing system 300 that may be used to implement the performance management system 205 of FIG. 2, in accordance with some embodiments of the inventive subject matter, comprises input device(s) 302, such as a keyboard or keypad, a display 304, and a memory 306 that communicate with a processor 308. The data processing system 300 may further include a storage system 310, a speaker 312, and an input/output (I/O) data port(s) 314 that also communicate with the processor 308. The storage system 310 may include removable and/or fixed media, such as floppy disks, ZIP drives, hard disks, or the like, as well as virtual storage, such as a RAMDISK. The I/O data port(s) 314 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 306 may be configured with a performance monitoring and management engine module 316 that may be configured to manage the performance of one or more data processing systems through generation of both an operational status of the data processing system and generation of a sentimental status of the data processing system. A composite status of the data processing system may be generated that is based on both the operational status and the sentimental status.

Figure 4:
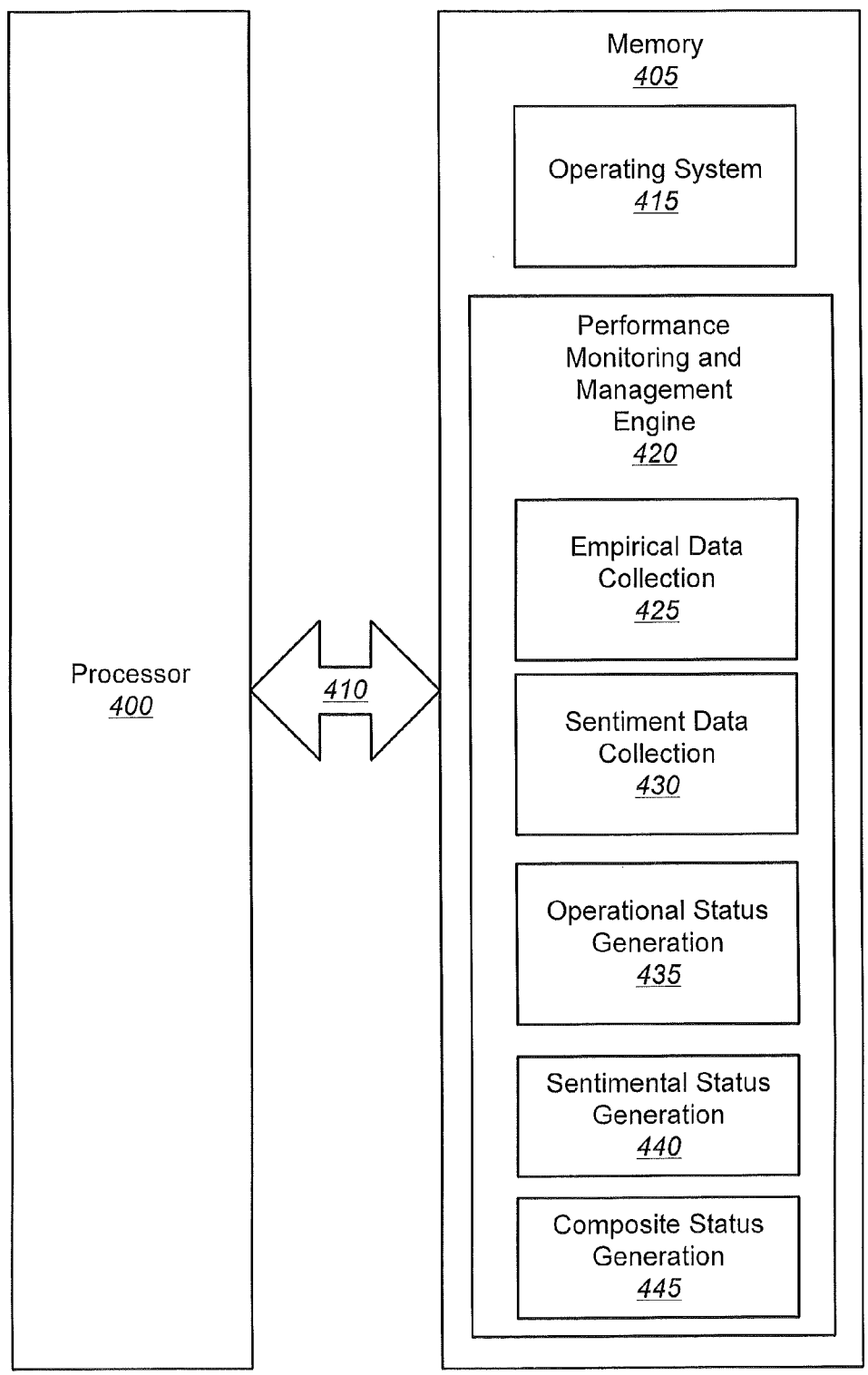
FIG. 4 is a block diagram that illustrates a software/hardware architecture for managing the performance of one or more data processing systems through generation of both an operational status of the data processing system and generation of a sentimental status of the data processing system according to some embodiments of the present inventive subject matter.

FIG. 4 illustrates a processor 400 and memory 405 that may be used in embodiments of data processing systems, such as the performance management system 205 of FIG. 2 and the data processing system 300 of FIG. 3, respectively, for managing the performance of one or more data processing systems through generation of both an operational status of the data processing system and generation of a sentimental status of the data processing system, according to some embodiments of the inventive subject matter. The processor 400 communicates with the memory 405 via an address/data bus 410. The processor 400 may be, for example, a commercially available or custom microprocessor. The memory 405 is representative of the one or more memory devices containing the software and data used for managing the performance of one or more data processing systems through visualization of performance metrics data via a cognitive map in accordance with some embodiments of the inventive subject matter. The memory 405 may include, but is not limited to, the following types of devices: cache, ROM, PROM, EPROM, EEPROM, flash, SRAM, and DRAM.

As shown in FIG. 4, the memory 405 may contain up to two or more categories of software and/or data: an operating system 415 and a performance monitoring and management engine module 420. The operating system 415 generally controls the operation of the data processing system. In particular, the operating system 415 may manage the data processing system's software and/or hardware resources and may coordinate execution of programs by the processor 400. The performance monitoring and management engine module 420 may be configured to managing the performance of one or more data processing systems by generating both an operational status of the data processing system and a sentimental status of the data processing system, which can be used to generate a composite status of the data processing system. The performance monitoring and management engine module 420 comprises an empirical data collection module 425, a sentiment data collection module 430, an operational status generation module 435, a sentimental status generation module 440, and a composite status generation module 445.

The empirical data collection module 425 may be configured to communicate with one or more data processing systems to collect performance data for one or more system performance metrics. In accordance with some embodiments of the inventive subject matter, these metrics may include, but are not limited to, cumulative network traffic volume data, recent network traffic volume data, cumulative Transmission Control Protocol (TCP) connections data, recent TCP connections data, Central Processing Unit (CPU) utilization data, thread CPU utilization data, and/or memory utilization data.

The sentiment data collection module 430 may be configured to communicate with one or more server systems that are sources of user sentiment data for one or more of the data processing systems being monitored. In accordance with some embodiments of the inventive subject matter, the user sentiment data may include, but is not limited to, social networking comment data, customer survey data, service desk system data, Internet blog data, Internet forum data, and/or CRM data. The social networking comment data may include, but are not limited to, Internet search engine comments, Facebook posts, and/or Twitter tweets.

The operational status generation module 435 may be configured to generate the operational status of the data processing system based on the empirical data collected by the empirical data collection module 425 that are associated with operations of the data processing system. In accordance with some embodiments of the inventive subject matter, the operational status generation module 435 may define operational metrics with defined thresholds. These metrics and associated performance thresholds may be indicative of a minimum acceptable level of performance and may be based on, for example, agreements or contracts with one or more users or customers of the data processing system. The empirical data collected by the empirical data collection module 425 may be compared with the defined thresholds for the operational metrics and an operational policy may be applied to the comparison result to generate the operational status of the data processing system. For example, a performance metric may be defined for CPU utilization along with an associated threshold. The operational policy may indicate that the operational status is considered to be good if the CPU utilization is below the threshold, poor if the CPU utilization is above the threshold by no more than a first amount, and failing if the CPU utilization is above the threshold by more than the first amount. The thresholds associated with the operational metrics may be based on historical norms for the data processing systems. For example, a high CPU utilization compared with unusually high memory utilization might be cause for an alarm or might not be depending on what the average operational norm for the data processing system is.

The sentimental status generation module 440 may be configured to generate the sentimental status of the data processing system based on the user sentiment data collected by the sentiment data collection module 430. In accordance with some embodiments of the inventive subject matter, the sentimental status of the data processing system can be generated for the data processing system as a whole and/or for individual applications that are provided through the data processing system. Similar to the operational status, the sentimental status may be generated based on a comparison of the user sentiment data with historical norms. If there is always some level of complaints or dissatisfaction with operation of the data processing system, then such discontent may not be cause for concern, but if the frequency or intensity of the complaints about the system increase, then such feedback may be indicative that the overall user sentiment for the data processing system and the services it provides may not be very good.

The composite status generation module 445 may be configured to generate the composite status of the data processing system based on the operational status generated by the operational status generation module 435 and the sentimental status generated by the sentimental status generation module 440. In accordance with some embodiments of the inventive subject matter, the composite status of the data processing system can be generated by applying a composite policy to the operational status and the sentimental status. For example, a composite policy may indicate that even if the operational status of the data processing system indicates the data processing system is operating properly, i.e., the empirical data for the operational metrics all indicate satisfactory operation based on pre-defined thresholds for the data, if one or users have used sufficiently derogatory language in describing their sentiment for the data processing system or applications/services running thereon, then the composite status will indicate that the data processing system is not functioning properly so as to provide an alert to an administrator to investigate and potentially take action to improve the performance and operation of the data processing system.

Although FIG. 4 illustrates hardware/software architectures that may be used in data processing systems, such as the performance management system 205 of FIG. 2 and the data processing system 300 of FIG. 3, for managing the performance of one or more data processing systems through generation of both an operational status of the data processing system and generation of a sentimental status of the data processing system, according to some embodiments of the inventive subject matter, it will be understood that the present invention is not limited to such a configuration but is intended to encompass any configuration capable of carrying out operations described herein. Moreover, the functionality of the performance management system 205 of FIG. 2, the data processing system 300 of FIG. 3, and/or the hardware/software architecture of FIG. 4 may be implemented as a single processor system, a multi-processor system, a multi-core processor system, or even a network of stand-alone computer systems, in accordance with various embodiments.

Computer program code for carrying out operations of data processing systems discussed above with respect to FIG. 4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 5:
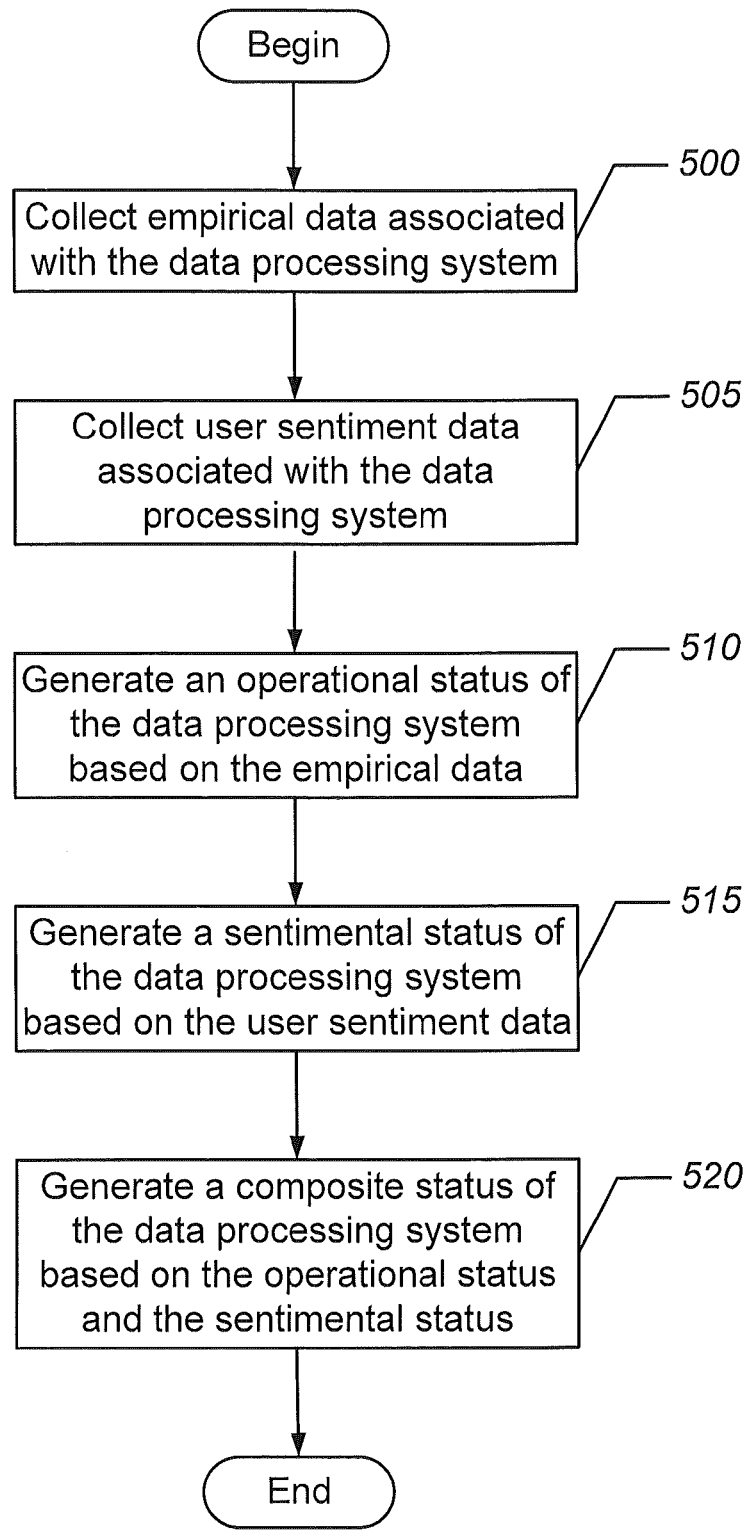
FIG. 5 is a flowchart that illustrates operations for managing the performance of one or more data processing systems through generation of both an operational status of the data processing system and generation of a sentimental status of the data processing system, according to some embodiments of the inventive subject matter.

FIG. 5 is a flowchart that illustrates operations for managing the performance of one or more data processing systems through generation of both an operational status of the data processing system and generation of a sentimental status of the data processing system, according to some embodiments of the inventive subject matter. Operations begin at block 500 where the empirical data collection module 425 collects empirical data associated with operations of the data processing system. At block 505, the sentiment data collection module 430 collects user sentiment data associated with the data processing system. The operational status generation module 435 generates the operational status of the data processing system at block 510 based on the empirical data that has been collected. The sentimental status generation module 440 generates the sentimental status of the data processing system at block 515 based on the user sentiment data. At block 520, the composite status generation module 445 generates the composite status of the data processing system based on both the operational status and the sentimental status.

The performance monitoring and management engine module 420 may communicate the operational status, the sentimental status, and/or the composite status to an administrator of the data processing system. Such information may be communicated in various ways in accordance with different embodiments of the inventive subject matter including, but not limited to, display on a network operations console, email message, SMS message, and the like. Similarly, the performance monitoring and management engine module 420 may communicate one or more alerts for an administrator based on the operational status, sentimental status, and/or composite status of the data processing system. These alert(s) can be communicated to the administrator of the data processing system in similar fashion as the operational status, sentimental status, and/or composite status are communicated.

Conventional monitoring of computer system performance metrics may provide an administrator with a status update on whether the computer system is working or not and whether desired levels of service are being met. But such performance information may not provide insight into what key customers, stakeholders, executives, and the like think of the services being provided by the computer system. The embodiments of methods, systems, and computer program products described herein may allow for the performance of a data processing system to be assessed based on both empirical data associated with operations of the data processing system along with user sentiment data associated with perceptions of the individuals that interact with the data processing system. By combining hard empirical data with sentiment data derived from user comments, administrators may be able to provide improved customer service by bringing to light situations where a data processing system appears to be running great, but customers are dissatisfied with their interactions with the data processing system.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
performing operations as follows on a processor:
communicating with a data processing system to collect empirical data associated with operations of the data processing system;
communicating with a customer feedback system to collect user sentiment data associated with the data processing system;
generating an operational status of the data processing system based on the empirical data;
generating a sentimental status of the data processing system based on the user sentiment data; and
generating a composite status of the data processing system based on the operational status and the sentimental status.

2. The method of claim 1, wherein the empirical data comprises cumulative network traffic volume data, recent network traffic volume data, cumulative Transmission Control Protocol (TCP) connections data, recent TCP connections data, Central Processing Unit (CPU) utilization data, thread CPU utilization data, and/or memory utilization data.

3. The method of claim 1, wherein the user sentiment data comprises social networking comment data, customer survey data, service desk system data, Internet blog data, Internet forum data, and/or Customer Relationship Management (CRM) data.

4. The method of claim 3, wherein the social networking comment data comprises Internet search engine comments, Facebook posts, and/or Twitter tweets.

5. The method of claim 3, wherein generating an operational status of the data processing system comprises:
defining operational metrics with defined thresholds, respectively;
comparing the empirical data with the defined thresholds to generate a comparison result; and
applying an operational policy to the comparison result to generate the operational status.

6. The method of claim 1, wherein generating the sentimental status of the data processing system comprises:
generating a sentimental status for an application that executes on the data processing system.

7. The method of claim 1, wherein generating the composite status of the data processing system comprises:
applying a composite policy to the operational status and the sentimental status to generate the composite status.

8. The method of claim 7, further comprising:
communicating the operational status, the sentimental status, and the composite status to an administrator of the data processing system.

9. The method of claim 7, further comprising:
generating an alert for an administrator of the data processing system based on the operational status, the sentimental status, and/or the composite status.

10. A system, comprising:
a processor; and
a memory coupled to the processor and comprising computer readable program code embodied in the memory that when executed by the processor causes the processor to perform operations comprising:
communicating with a data processing system to collect empirical data associated with operations of the data processing system;
communicating with a customer feedback system to collect user sentiment data associated with the data processing system;
generating an operational status of the data processing system based on the empirical data;
generating a sentimental status of the data processing system based on the user sentiment data; and
generating a composite status of the data processing system based on the operational status and the sentimental status.

11. The system of claim 10, wherein the empirical data comprises cumulative network traffic volume data, recent network traffic volume data, cumulative Transmission Control Protocol (TCP) connections data, recent TCP connections data, Central Processing Unit (CPU) utilization data, thread CPU utilization data, and/or memory utilization data.

12. The system of claim 10, wherein the user sentiment data comprises social networking comment data, customer survey data, service desk system data, Internet blog data, Internet forum data, and/or Customer Relationship Management (CRM) data.

13. The system of claim 12, wherein the social networking comment data comprises Internet search engine comments, Facebook posts, and/or Twitter tweets.

14. The system of claim 12, wherein generating an operational status of the data processing system comprises:
defining operational metrics with defined thresholds, respectively;
comparing the empirical data with the defined thresholds to generate a comparison result; and
applying an operational policy to the comparison result to generate the operational status.

15. The system of claim 10, wherein generating the sentimental status of the data processing system comprises:
generating a sentimental status for an application that executes on the data processing system.

16. The system of claim 10, wherein generating the composite status of the data processing system comprises:
applying a composite policy to the operational status and the sentimental status to generate the composite status.

17. The system of claim 16, wherein the operations further comprise:
communicating the operational status, the sentimental status, and the composite status to an administrator of the data processing system.

18. The system of claim 16, wherein the operations further comprise:
generating an alert for an administrator of the data processing system based on the operational status, the sentimental status, and/or the composite status.

19. A computer program product, comprising:
a tangible computer readable storage medium comprising computer readable program code embodied in the medium that when executed by a processor causes the processor to perform operations comprising:
communicating with a data processing system to collect empirical data associated with operations of the data processing system;
communicating with a customer feedback system to collect user sentiment data associated with the data processing system;
generating an operational status of the data processing system based on the empirical data;
generating a sentimental status of the data processing system based on the user sentiment data; and
generating a composite status of the data processing system based on the operational status and the sentimental status.

20. The computer program product of claim 19, wherein the empirical data comprises cumulative network traffic volume data, recent network traffic volume data, cumulative Transmission Control Protocol (TCP) connections data, recent TCP connections data, Central Processing Unit (CPU) utilization data, thread CPU utilization data, and/or memory utilization data.

21. The computer program product of claim 19, wherein the user sentiment data comprises social networking comment data, customer survey data, service desk system data, Internet blog data, Internet forum data, and/or Customer Relationship Management (CRM) data.

22. The computer program product of claim 21, wherein the social networking comment data comprises Internet search engine comments, Facebook posts, and/or Twitter tweets.

23. The computer program product of claim 21, wherein generating an operational status of the data processing system comprises:
defining operational metrics with defined thresholds, respectively;
comparing the empirical data with the defined thresholds to generate a comparison result; and
applying an operational policy to the comparison result to generate the operational status.

24. The computer program product of claim 19, wherein generating the sentimental status of the data processing system comprises:

generating a sentimental status for an application that executes on the data processing system.

25. The computer program product of claim 19, wherein generating the composite status of the data processing system comprises:
applying a composite policy to the operational status and the sentimental status to generate the composite status.

26. The computer program product of claim 25, wherein the operations further comprise:
communicating the operational status, the sentimental status, and the composite status to an administrator of the data processing system.

27. The computer program product of claim 25, wherein the operations further comprise:
generating an alert for an administrator of the data processing system based on the operational status, the sentimental status, and/or the composite status.

* * * * *